(12) United States Patent
Takahashi et al.

(10) Patent No.: US 11,069,466 B2
(45) Date of Patent: Jul. 20, 2021

(54) VIBRATION ACTUATOR AND VIBRATION PROVIDING APPARATUS

(71) Applicants: Yuki Takahashi, Tokyo (JP); Tomoya Ishitani, Tokyo (JP)

(72) Inventors: Yuki Takahashi, Tokyo (JP); Tomoya Ishitani, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 240 days.

(21) Appl. No.: 16/286,804

(22) Filed: Feb. 27, 2019

(65) Prior Publication Data
US 2019/0304650 A1 Oct. 3, 2019

(30) Foreign Application Priority Data
Mar. 30, 2018 (JP) .............................. JP2018-069001

(51) Int. Cl.
| | | |
|---|---|---|
| *H02K 33/00* | (2006.01) | |
| *H01F 7/08* | (2006.01) | |
| *H01F 7/126* | (2006.01) | |
| *H01F 7/16* | (2006.01) | |
| *H01F 27/24* | (2006.01) | |
| *G06F 3/01* | (2006.01) | |
| *H01F 27/28* | (2006.01) | |
| *G06F 3/041* | (2006.01) | |

(52) U.S. Cl.
CPC ............. *H01F 7/081* (2013.01); *G06F 3/016* (2013.01); *H01F 7/126* (2013.01); *H01F 7/16* (2013.01); *H01F 27/24* (2013.01); *H01F 27/28* (2013.01); *H02K 33/00* (2013.01); *G06F 3/041* (2013.01); *H01F 2007/086* (2013.01)

(58) Field of Classification Search
CPC ............................... G06F 3/016; H02K 33/00
USPC ............................................ 335/229; 310/36
See application file for complete search history.

(56) References Cited

U.S. PATENT DOCUMENTS

| | | | | |
|---|---|---|---|---|
| 3,493,793 A | * | 2/1970 | Niemela ................. | H02K 33/06 310/29 |
| 3,538,359 A | * | 11/1970 | Barowski ........... | A61C 17/3418 310/29 |
| 5,263,218 A | * | 11/1993 | Giuliani ................. | A61C 17/20 15/22.1 |

(Continued)

FOREIGN PATENT DOCUMENTS

| | | |
|---|---|---|
| JP | 2015-070729 A | 4/2015 |
| JP | 2016-163854 A | 9/2016 |

*Primary Examiner* — Alexander Talpalatski
(74) *Attorney, Agent, or Firm* — Brundidge & Stanger, P.C.

(57) ABSTRACT

A vibration actuator includes: a fixing body having N-fold (N is a natural number) of 2 of core pole parts and a coil wound around each of the core pole parts; a movable body having a magnet part disposed being separated from each of the core pole parts in an axial direction of each of the core pole parts, for each of the core pole parts; and an elastic support part that movably supports the movable body, in which the magnet part has a magnetic pole disposed on each of the core pole part sides and facing each of the core pole parts, and in which the movable body vibrates in a direction orthogonal to both directions including a direction in which the N-fold of 2 of the core pole parts are aligned and the axial direction of the coil by the energization of the coil.

9 Claims, 11 Drawing Sheets

(56) References Cited

U.S. PATENT DOCUMENTS

| | | | | |
|---|---|---|---|---|
| 6,249,198 B1* | 6/2001 | Clark | ............... | F04B 43/04 |
| | | | | 335/229 |
| 6,933,630 B2* | 8/2005 | Kraus | ............... | B26B 19/28 |
| | | | | 30/43.7 |
| 2015/0109223 A1* | 4/2015 | Kessler | ............... | G06F 3/016 |
| | | | | 345/173 |
| 2015/0169061 A1 | 6/2015 | Odajima et al. | | |

* cited by examiner

VIBRATION ACTUATOR AND VIBRATION PROVIDING APPARATUS

CROSS REFERENCE TO RELATED APPLICATIONS

This application is entitled to the benefit of Japanese Patent Application No. 2018-069001, filed on Mar. 30, 2018, the disclosure of which including the specification, drawings and abstract is incorporated herein by reference in its entirety.

TECHNICAL FIELD

The present invention relates to a vibration actuator and a vibration providing apparatus including the vibration actuator.

BACKGROUND ART

Conventionally, when operating a touch panel which is a sensing panel, a configuration is known in which vibration is imparted to a finger pulp by a vibration actuator when the finger pad or the like of a user is in contact with a display screen displayed on the touch panel (refer to PTL 1 and PTL 2).

PTL 1 discloses a mobile terminal apparatus in which a vibration actuator is attached to a back surface of a touch panel via a vibration transmission part. In the vibration actuator, a movable element is disposed in a housing fixed to a vibration transmission part to be capable of reciprocating along a guide shaft disposed perpendicular to the touch panel. In the vibration actuator, vibration is imparted to the finger pulp which comes into contact with the touch panel via the vibration transmission part by causing the moving element to collide with the housing in response to an operation on the touch panel.

In addition, in PTL 2, a vibration providing apparatus that imparts vibration in response to an operation on a touch panel is disclosed. In the vibration providing apparatus, between a vibration panel which is a vibration part which provides vibration and a housing which supports the vibration panel, a voice coil motor for generating vibration, a support part which is disposed together with the vibration panel and compressed by a predetermined force, a damper for imparting a braking action to the vibration of the vibration part, and a spring for imparting a compressive force to the support part and the damper are provided in parallel with each other.

CITATION LIST

Patent Literature

PTL 1
Japanese Patent Application Laid-Open No. 2015-070729
PTL 2
Japanese Patent Application Laid-Open No. 2016-163854

SUMMARY OF INVENTION

Technical Problem

Incidentally, similar to the related art, in an apparatus which imparts vibration when touching a touch panel and performs an operation, attenuation occurs when generating the vibration to be transmitted or in the middle of a path through which the vibration is transmitted, that is, it is difficult to feed back to a user with a strong feeling. For example, in PTL 1, since the movable body slides on the guide shaft, the vibration transmitted to the vibration transmission part by the sliding actuator is attenuated, and in PTL 2, when vibrating the vibration panel with respect to the housing, the vibration of the vibration panel attenuates due to the support part, the damper, and the spring between the housing and the vibration panel.

Furthermore, as described in PTL 2, in a case where the vibration panel connected to the touch panel is directly driven, when it is desired to generate strong vibration while ensuring sufficient rigidity, it is necessary to provide a plurality of vibration generating apparatuses, and there is a problem that production cost increases. In addition, since a space on the back side of the touch panel is generally narrow, it is difficult to dispose the plurality of vibration generating apparatuses.

Accordingly, when the user operates the touch panel, there is a demand for a vibration actuator capable of imparting sufficient vibration and a strong feeling to a finger pulp which is in a contact state during the operation and making it possible to achieve a thin structure.

An object of the invention is to provide a vibration actuator capable of imparting a strong feeling to a user when operating a touch panel and making it possible to achieve a thin structure even in a case of being attached to the touch panel, and a vibration providing apparatus including the vibration actuator.

Solution to Problem

In order to achieve the object mentioned above, the present invention provides a vibration actuator, including: a fixing body including N-fold (N is a natural number) of 2 of core pole parts and a coil wound around an outer periphery of each of the core pole parts; a movable body including a magnet part disposed while being separated from each of the core pole parts in an axial direction of each of the core pole parts, for each of the core pole parts; and an elastic support part that movably supports the movable body with respect to the fixing body, in which the magnet part includes magnetic poles disposed on sides of the core pole parts and respectively facing the core pole parts, and in which the movable body vibrates in a direction orthogonal to both directions including a direction in which the N-fold of 2 of the core pole parts are aligned and the axial direction of the coil by an attractive force or a repulsive force between the core pole parts to be excited by the energization of the coil and the magnet part.

A vibration providing apparatus of the present invention includes: the vibration actuator described above; and a touch panel on which the vibration actuator is mounted.

Advantageous Effects of Invention

According to the invention, even in a case where the vibration actuator is attached to the touch panel, it is possible to impart a strong feeling to the user when operating the touch panel and to realize a thin structure.

DESCRIPTION OF EMBODIMENTS

Hereinafter, embodiments of the invention will be described in detail with reference to the drawings.

Descriptions will be given for the embodiment with an orthogonal coordinate system (X, Y, Z). The same orthogonal coordinate system (X, Y, Z) is also used for illustration of below-mentioned figures. In the following, the width, the depth, and the height of vibration actuator 10 are the lengths in an X direction, in a Y direction, and in a Z direction, respectively. Further, description will be given on the assumption that a plus side in the Z direction is "upper side" and a minus side in the Z direction is "lower side".

<Overall Configuration of Vibration Actuator 10>

Figure 1:
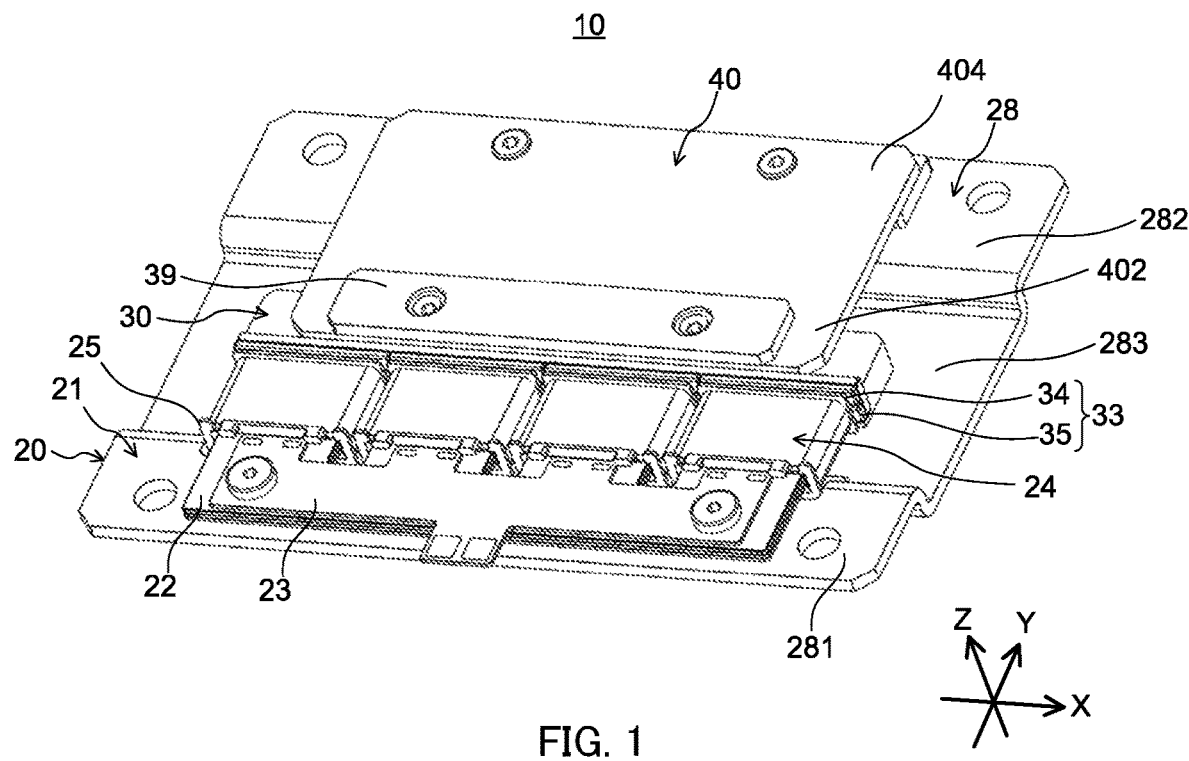
FIG. 1 is an external perspective view on a planar side of a vibration actuator according to Embodiment 1 of the invention.
Figure 2:
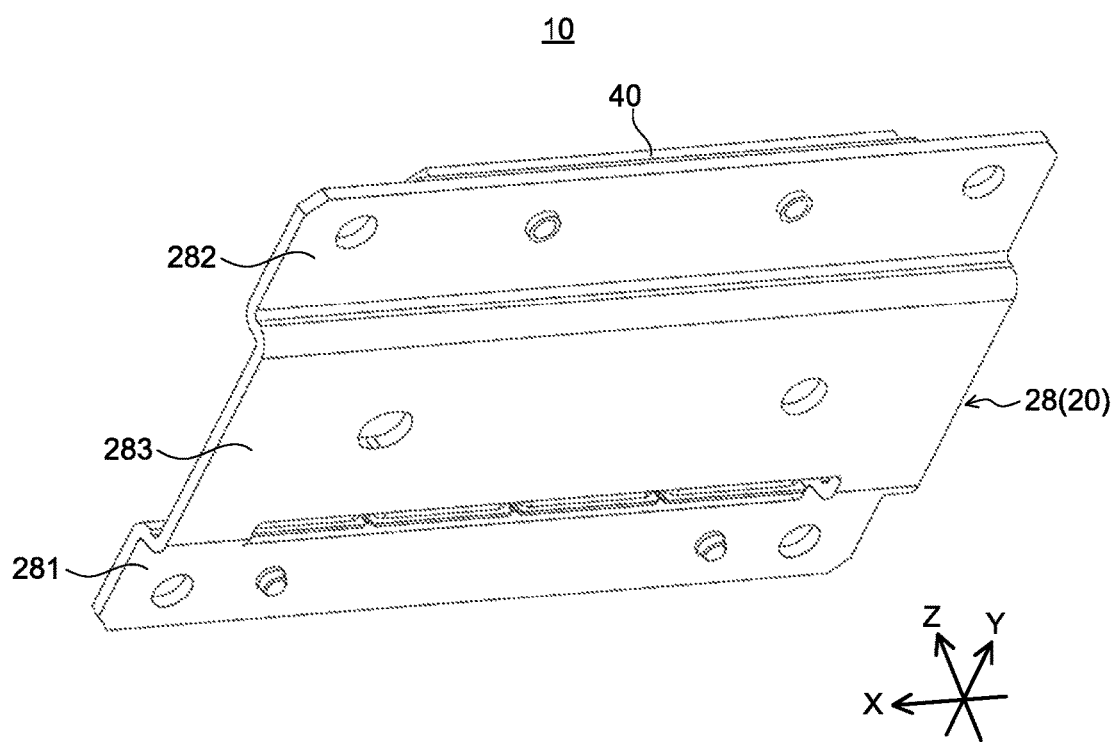
FIG. 2 is an external perspective view on a bottom side of the vibration actuator according to Embodiment 1 of the invention.
Figure 3:
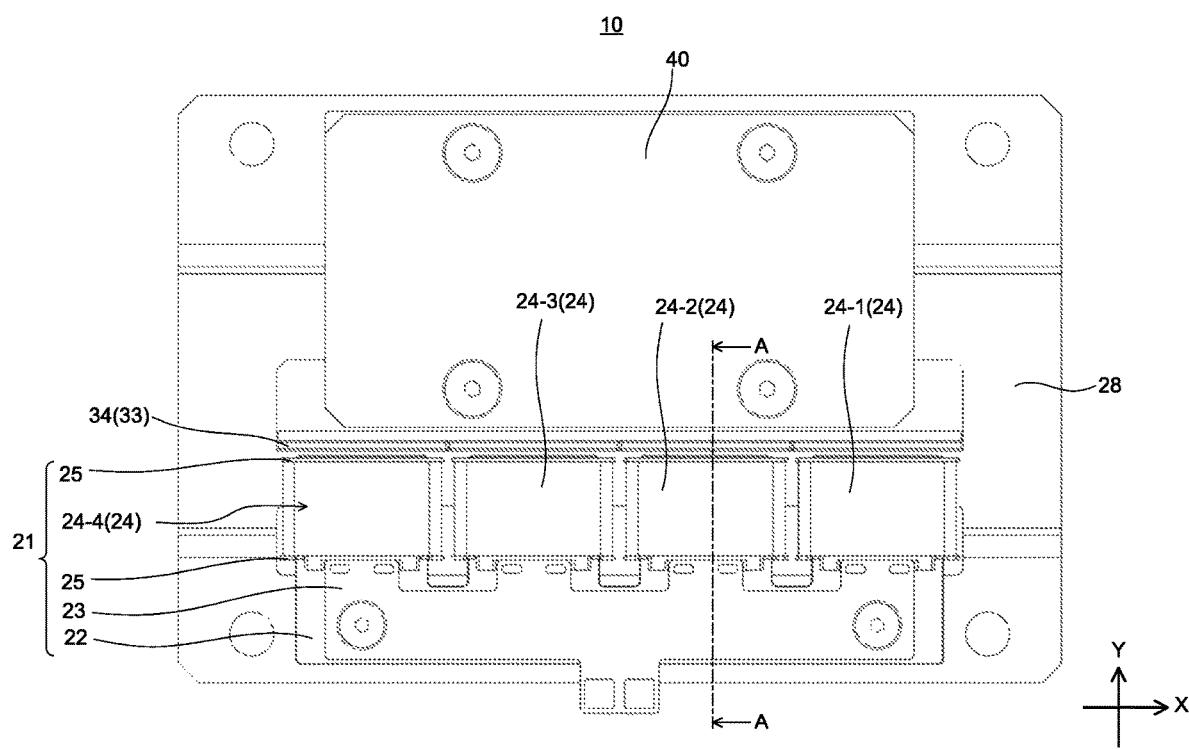
FIG. 3 is a plan view of the vibration actuator according to Embodiment 1 of the invention.
Figure 4:
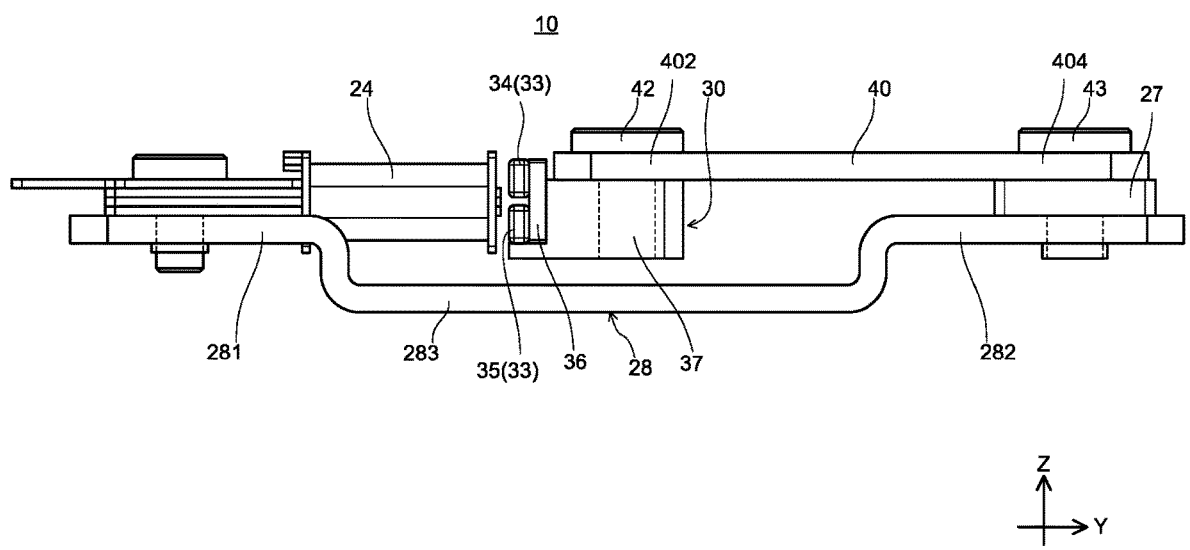
FIG. 4 is a view on a right side of the vibration actuator according to Embodiment 1 of the invention.
Figure 5:
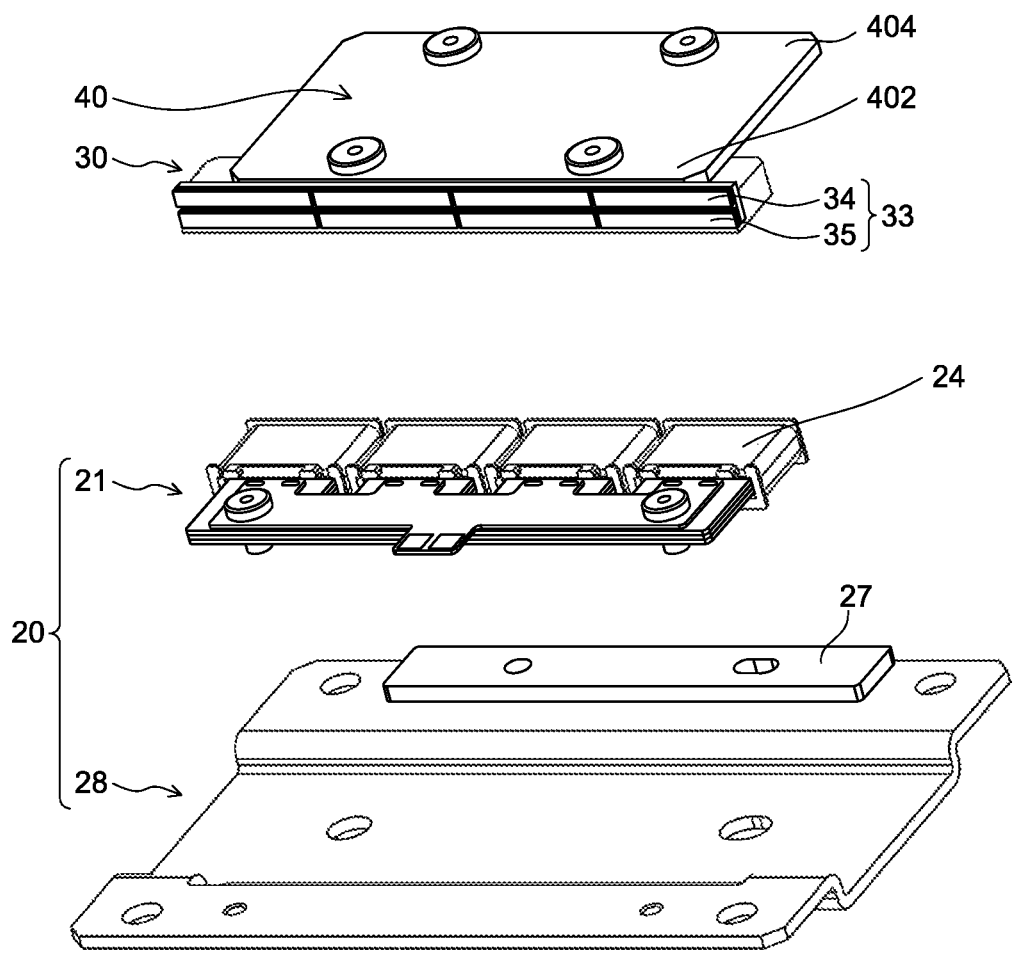
FIG. 5 is an exploded view of main parts of the vibration actuator according to Embodiment 1 of the invention.
Figure 6:
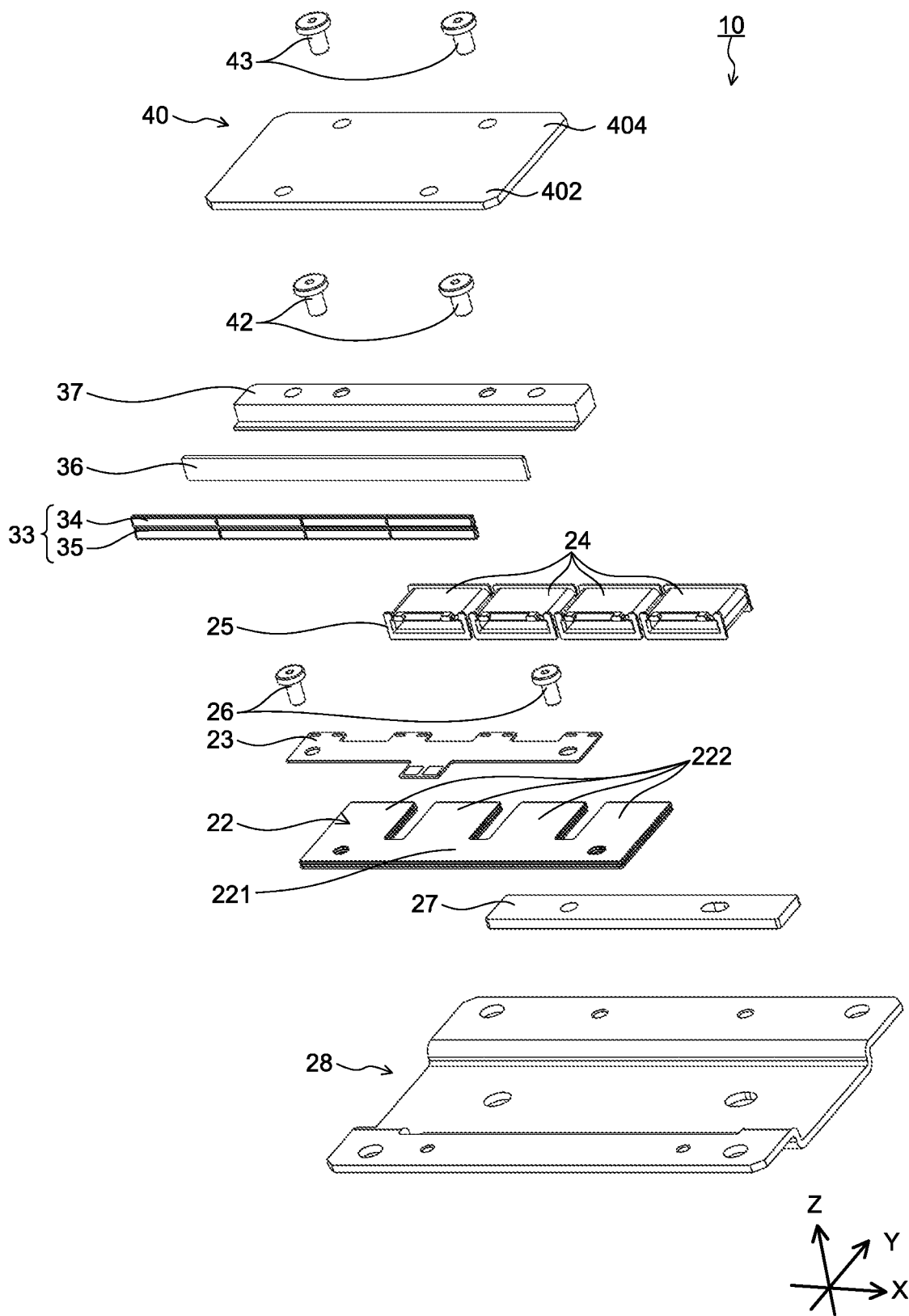
FIG. 6 is an exploded view of the vibration actuator according to Embodiment 1 of the invention.

FIG. 1 is an external perspective view on a planar side of vibration actuator 10 according to Embodiment 1 of the invention, and FIG. 2 is an external perspective view of a bottom side of vibration actuator 10 according to Embodiment 1 of the invention. In addition, FIG. 3 is a plan view of vibration actuator 10 according to Embodiment 1 of the invention, and FIG. 4 is a view on a right side of vibration actuator 10 according to Embodiment 1 of the invention. Further, FIG. 5 is an exploded perspective view of main parts of the vibration actuator according to Embodiment 1 of the invention, and FIG. 6 is an exploded perspective view on the vibration actuator according to Embodiment 1 of the invention.

Vibration actuator 10 illustrated in FIGS. 1 to 4 is mounted on an electronic device as a vibration generation source to realize a vibration function of the electronic device. Vibration actuator 10 functions as a vibration providing apparatus which is mounted on the electronic device and provides the vibration to a user. As the electronic device, for example, a car navigation apparatus and the like having touch panel apparatus 100 (refer to FIGS. 10 and 11) can be employed. In addition, touch panel apparatus 100 is an example of the vibration providing apparatus, and in the embodiment, touch panel apparatus 100 has a touch panel as a panel that the user can touch with the hands, fingers, and the like. The touch panel may be a panel having a display function for displaying images and the like which can be touched by the user, or may have an operation part that can be simply touched by the user and operated without the display function.

Vibration actuator 10 according to the embodiment is applied to touch panel apparatus 100 which makes it possible for the user who has touched the touch panel to perform an intuitive operation by being mounted on touch panel 60 (refer to FIGS. 10 and 11) for displaying the images, and by transmitting the vibration to the user in response to a contact operation on the screen and making the user feel the vibration. In addition, touch panel 60 of touch panel apparatus 100 has a contact position output part which receives the contact operation by the user on touch panel 60 and outputs the contact position. Vibration actuator 10 is joined to touch panel 60, receives a driving signal from a control part (not illustrated), is driven by generating the vibration that corresponds to the contact position output from touch panel 60, transmits the vibration to touch panel 60, and directly vibrates touch panel 60.

Vibration actuator 10 includes: fixing body 20 having core 22 including core pole part 222 around which coil 24 is wound; movable body 30 having magnet parts 33 (34, 35) disposed being separated from each other in an axial direction of core pole part 222, in core pole part 222; and elastic support part 40 which elastically supports movable body 30 to be movable in a vibration direction with respect to fixing body 20.

Vibration actuator 10 vibrates movable body 30 by cooperation between core 22 and coil 24 and magnet part 33 (34, 35). Specifically, movable body 30 vibrates due to an attractive force or a repulsive force generated between coil 24 to be energized and core pole part 222 of core 22 to be excited by coil 24 to be energized and magnet part 33 (34, 35).

Vibration actuator 10 is a flat vibration body of which a thickness direction is the Z direction. Vibration actuator 10 vibrates movable body 30 with respect to fixing body 20 considering the Z direction, that is, the thickness direction, as the vibration direction, and vibrates movable body 30 with one surface of the front and back surfaces disposed being separated from each other in the thickness direction as the other surface in the Z direction.

In vibration actuator 10 according to the embodiment, as one end side of elastic support part 40 formed in a flat plate shape is fixed to fixing body 20 and the other end side is fixed to movable body 30, movable body 30 is supported to be movable in the vibration direction (the Z direction, and here, an up-down direction) with respect to fixing body 20. Specifically, elastic support part 40 is fixed to fixing body 20 at one end portion of both end portions separated from each other in a direction orthogonal to the vibration direction, here, in a depth direction (Y direction), and movable body 30 is fixed by the other end portion.

<Fixing Body 20>

As illustrated in FIG. 5, fixing body 20 has core unit 21 having core 22 and coil 24, base plate 28, and attenuation material 27.

Base plate 28 is a flat member and forms a bottom surface of vibration actuator 10. Base plate 28 has one side portion 281 to which core unit 21 is attached and the other side portion 282 for fixing elastic support part 40 at a position separated from one side portion 281.

In the embodiment, base plate 28 is configured such that one side portion 281 and the other side portion 282 are positioned being separated from each other in the depth direction by processing a sheet metal. Between one side portion 281 and the other side portion 282, a concave portion having bottom surface portion 283 of which a height is lower than that of one side portion 281 and the other side portion 282. The space on the inner side of the concave portion, that is, on the front surface side of bottom surface portion 283 is a space for ensuring a movable region of movable body 30 supported by elastic support part 40 of bottom surface portion 283.

Core unit 21 has core 22 having the plurality of core pole parts 222, board 23, coil 24 that winds around the outer periphery of core pole part 222, and bobbin 25.

As illustrated in FIGS. 2 and 3, core unit 21 is fixed to one side portion 281 of base plate 28 with core pole part 222 oriented toward the other side portion 282 side.

In the embodiment, core unit 21 is firmly fixed to one side portion 281 by screw 26 (refer to FIG. 6) that serves as a fastening member.

Figure 7:
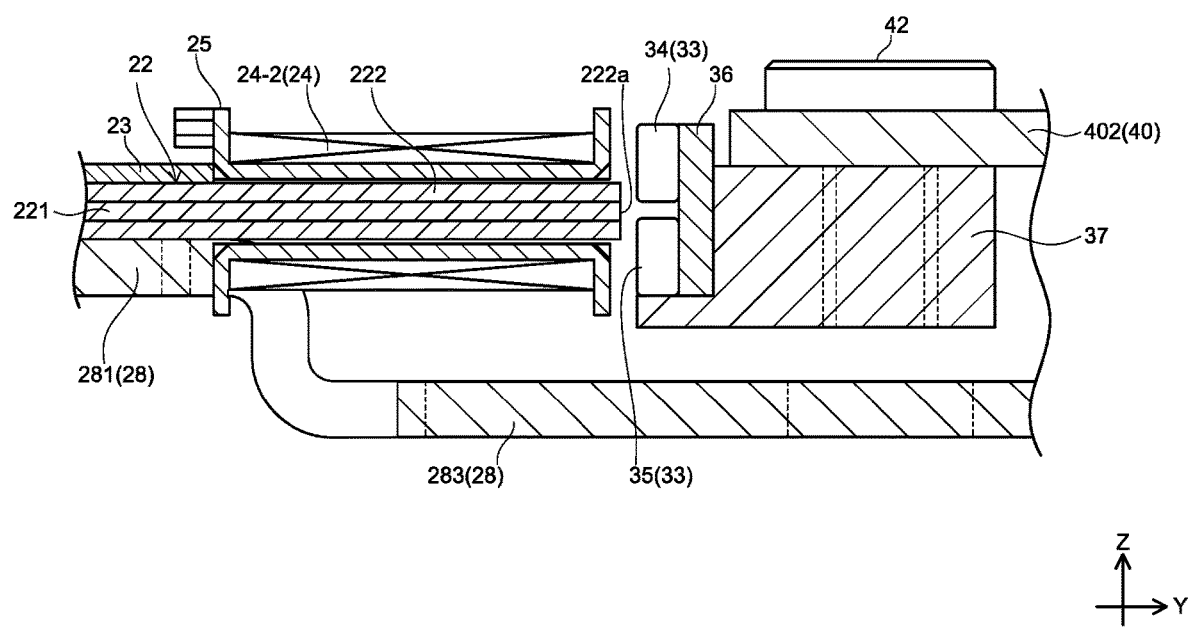
FIG. 7 is a partial sectional view taken along line A-A in FIG. 3.

FIG. 7 is a partial sectional view taken along line A-A in FIG. 3.

As illustrated in FIG. 7, core main body 221 of core 22 is fixed to one side portion 281, and core pole part 222 of core 22 is disposed to protrude from one side portion 281 to bottom surface portion 283 in a state where coil 24 is wound around the outer periphery via bobbin 25.

A cutout part that extends in a lateral direction is formed between one side portion 281 and bottom surface portion 283, and core 22 and coil 24 are arranged to go into the cutout part.

Core 22 is a magnetic body and has core pole part 222 that protrudes uniformly from core main body 221. Core 22 is formed of, for example, a silicon steel plate, permalloy, ferrite, or the like. In the embodiment, in core 22, four core pole parts 222 uniformly protrude from core main body 221.

Specifically, as illustrated in FIG. 6, in core 22, core pole part 222 is provided protruding in a shape of a comb teeth from the one side portion that extends in the lateral direction (corresponding to the X direction) in core main body 221 having a shape of a rectangular plate that extends in a direction orthogonal to the Z direction, here, in the lateral direction (X direction). Tip end surface 222a (refer to FIG. 7) of core pole part 222 is a surface which is excited to become a magnetic pole surface, and is disposed being aligned uniformly in the lateral direction as illustrated in FIGS. 1 and 3.

Bobbin 25 around which coil 24 is wound is externally fitted to the outer periphery of core pole part 222 of core 22. In other words, coils 24 are wound around core pole part 222 via bobbin 25, respectively. In addition, bobbin 25 is attached to core pole part 222 in a state where coil 24 is wound therearound, coil 24 is positioned at the outer periphery of core pole part 222, and accordingly, deformation or fray of coil 24 is suppressed, and workability and installation are improved.

In addition, bobbin 25 is formed of, for example, a resin material. Accordingly, since it is possible to ensure electrical insulation with another member made of metal (for example, core 22), reliability is improved. For the resin material, by using a highly flowable resin, the formability becomes excellent, and it is possible to make the thickness thin while ensuring the strength of bobbin 25.

Core pole part 222 is disposed being adjacent to each other in the vibration direction, here, in the direction orthogonal to the Z direction (here, X and −X directions).

Core pole part 222 is excited by supplying an electric current to coil 24 wound around core pole part 222, and the tip end surface becomes magnetic pole surface 222a.

Core pole part 222 is aligned in a direction (X direction) orthogonal to the Z direction and excited with magnetic poles different from each other by energizing coils 24 which are respectively wound therearound, and tip end surface 222a has polarities different from each other, such as N pole, S pole, N pole, and S pole, or S pole, N pole, S pole, N pole. Accordingly, it is possible to enhance the magnetic circuit efficiency.

In the embodiment, since core 22 has four core pole parts 222, coils 24 which are respectively wound around core pole parts 222 adjacent to each other are wound in different directions to excite core pole parts 222 adjacent to each other alternately with magnetic poles different from each other.

In addition, it is preferable that core 22 includes at least two or more and a multiple of 2, that is, N-fold (N is a natural number) of 2 of core pole parts 222. Accordingly, when coil 24 is energized, it is possible to configure a magnetic circuit that can excite core pole parts 222 adjacent to each other to have different magnetic poles, and it is possible to enhance the magnetic circuit efficiency and to realize a more efficient vibration output.

Coil 24 is energized at the time of driving, and configures the magnetic circuit that becomes a vibration generating source together with core 22 wound around the outer periphery and magnet part 33 (34, 35).

In core unit 21 of the embodiment, coil 24 that surrounds each of four core pole parts 222 is electrically connected. Four coils 24 are formed by one coil wire, and when being energized, coils 24 adjacent to each other are wound to have different polarities to be exited of core pole parts 222 which are respectively disposed as cores on inner sides of each of coils 24 adjacent to each other. In the plurality of coils 24-1 to 24-4 (refer to FIG. 3), when being energized, tip end surface 222a of core pole part 222 surrounded by each of at least two coils 24 adjacent to each other are magnetized to have different polarities. For example, coils 24 (24-1 to 24-4) adjacent to each other in coils 24-1 to 24-4 (refer to FIG. 3) are formed in different winding orientations, such as rightward winding and leftward winding.

Both end portions of coil 24 are connected to terminals of board 23 stacked on core 22. Coil 24 is energized via board 23.

Board 23 is a board on which a circuit for supplying electric power to coil 24 and driving vibration actuator 10 is mounted. Board 23 may be configured with a board connected to an external electric power source, for example, a flexible printed circuit (FPC) or the like. Board 23 is provided on core main body 221 of core 22, and is connected to the end portion of coil 24 wound around bobbin 25 in core unit 21. Board 23 supplies the electric power to coil 24 by supplying a driving signal, for example, to drive vibration actuator 10.

Attenuation material 27 attenuates the vibration transmitted from elastic support part 40 to fixing body 20. Specifically, attenuation material 27 is interposed between elastic support part 40 and the other side portion 282 of base plate 28, and attenuates the vibration from elastic support part 40 during the driving.

Attenuation material 27 is fixed via screw 43 between elastic support part 40 and the other side portion 282.

Attenuation material 27 is formed of a soft material, such as elastomer, rubber, resin, or a porous elastic body (for example, a sponge).

<Movable Body 30>

Movable body 30 is disposed opposing core unit 21 in the direction orthogonal to the vibration direction (Z direction), and vibrates back and forth in the vibration direction.

Movable body 30 has magnet part 33, back yoke 36, and magnet holder 37.

Magnet part 33 is disposed being separated from tip end surface 222a of core pole part 222 of core unit 21 by a predetermined distance in the axial direction of core pole part 222. The predetermined distance is a region in which movable body 30 is movable in the vibration direction (Z direction) with respect to tip end surface 222a of core pole part 222 that forms one side surface of core unit 21 by a magnetic attractive force or a magnetic repulsive force between coil 24 and core 22 to be energized and magnet part 33 (34, 35). In the embodiment, since movable body 30 is provided in one end portion 402 of elastic support part 40 swinging around the other end portion 404 side as a fulcrum, the predetermined distance may be a distance by which movable body 30 does not come into contact with core unit 21 even when swinging around the other end portion 404 side of elastic support part 40.

In the embodiment, magnet part 33 is configured with two magnets 34 and 35, is fixed to back yoke 36, and is held by magnet holder 37 together with back yoke 36. Back yoke 36 configures a magnetic circuit together with core 22, coil 24, and magnet part 33.

Magnet part 33 (34, 35) has two magnets 34 and 35 with respect to core pole part 222 of core 22 such that the magnetic pole surfaces having two different polarities are aligned in the vibration direction (here, the Z direction and corresponds to the thickness direction of movable body 30). In other words, magnet part 33 includes first magnet 34 and second magnet 35 which are disposed being aligned in the vibration direction in which movable body 30 vibrates and have different magnetic poles magnetized on core pole part 222 side, with respect to one of core pole parts 222. In addition, magnets 34 and 35 may be configured with, for example, an Nd sintered magnet or the like.

Magnets 34 and 35 are disposed opposing N-fold of 2 of core pole parts 222. For example, magnets 34 and 35 are disposed such that magnet 34 has the magnetic pole surface of the N pole being oriented toward core pole part 222 side in the upper stage and the magnetic pole surface of the S pole of magnet 35 being oriented toward core pole part 222 side of core 22 in the lower stage. In addition, the magnetic pole surface of the S pole may be disposed being oriented toward core pole part 222 in the upper stage and the magnetic pole surface of the N pole may be disposed being oriented toward core pole part 222 in the lower stage.

Magnets 34 and 35 aligned in the vibration direction are disposed such that the center in the vibration direction of magnets 34 and 35 opposes the center in the thickness direction of core pole part 222, that is, the center of the length in the vibration direction in core pole part 222.

Magnets 34 and 35 have a length that corresponds to the length in the lateral direction (X direction) of core pole parts 222 that oppose each other, and in the embodiment, magnets 34 and 35 have substantially the same band shape that extends in the direction orthogonal to the vibration direction.

In magnets 34 and 35, the magnetic pole surfaces which are opposing surfaces opposing core 22 are disposed such that the magnetic poles of the magnetic pole surfaces adjacent to each other become different in the lateral direction (in the X direction). In other words, the plurality of magnet parts 33 having magnets 34 and 35 are disposed being adjacent to each other along the X direction, and each of magnet parts 33 is disposed opposing each other in each of core pole parts 222 to be excited as different magnetic poles. Magnet parts 33 adjacent to each other along the X direction are provided such that the magnetic poles become different respectively between each of magnets 34 on the upper side and between each of magnets 35 on the lower side.

For example, magnet 34 illustrated in FIG. 5 is disposed to become S pole, N pole, S pole, and N pole from the right, and magnet 35 is disposed to become N pole, S pole, N pole, and S pole from the right.

In addition, magnets 34 and 35 are disposed with a gap formed in the vibration direction, here, in the up-down direction. Magnets 34 and 35 separated from each other in the up-down direction generate each of the magnetic attractive forces and attract tip end surface 222a of core pole part 222 of core 22. By the magnetic attractive force generated by each of magnets 34 and 35, core pole part 222 is canceled out by being attracted toward both the upper and lower sides, and is balanced, and the position that corresponds to the gap between magnets 34 and 35 is set as a reference position, and is held in a horizontal state. In other words, the reference position is a position at which a center position in the vibration direction in core pole part 222 and a center position in the vibration direction in magnets 34 and 35 are substantially on the same plane (including the same plane) or substantially on the same axial line (including the same axial line). In addition, when coil 24 is de-energized, tip end surface 222a of core pole part 222 against magnets 34 and 35 and the gap are positioned opposing each other in the axial direction (corresponding to the axis of coil 24) of core pole part 222.

In this manner, magnets 34 and 35 function as magnetic springs that attract tip end surface 222a of core pole part 222 of core 22 opposing the magnetic pole surface and hold tip end surface 222a at a position that opposes the gap between magnets 34 and 35 having different polarities. It is preferable that the height of the gap between magnets 34 and 35 is shorter than the thickness (the length in the Z direction) of core 22, specifically, the thickness (the length in the Z direction) of core pole part 222.

Since magnets 34 and 35 are held at the reference position (the position in the reference state) by a spring reaction force of elastic support part 40, due to the magnetic attractive force of core 22 and magnets 34 and 35, it is possible to suppress a force in a direction reverse to a thrust generated due to the electric current, it is possible to prevent the output from being lowered, and it becomes possible to generate a strong feeling.

Magnet holder 37 holds and fixes magnets 34 and 35 to elastic support part 40. Magnet holder 37 has a surface opposing core pole part 222, and magnets 34 and 35 are fixed to the surface.

Magnet holder 37 may be formed of any material, such as metal and resin, but is preferably a non-magnetic body so as not to influence the magnetic flux radiated from magnets 34 and 35.

<Elastic Support Part 40>

Elastic support part 40 movably supports movable body 30 with respect to fixing body 20.

Elastic support part 40 is fixed to base plate 28 and has elasticity that deforms in the vibration direction. In the embodiment, elastic support part 40 is a rectangular plate spring disposed in a direction intersecting the vibration direction of movable body 30, and extends in a magnetization direction (here, in the Y direction) of magnets 34 and 35.

Magnet part 33 opposing core 22 is fixed to one end portion 402 of elastic support part 40, and base plate 28 is fixed to the other end portion 404 via attenuation material 27. Specifically, one end portion 402 is fixed to magnet holder 37 that holds magnet part 33 and back yoke 36 on the back surface thereof via the fastening material, such as screw 42 or the like. In addition, in the vibration actuator of FIG. 1, cushioning material 39 is attached to the front surface of one end portion 402. The cushioning material 39 is disposed at a position overlapping magnet holder 37 in the vibration direction, is connected to the other member, and attaches movable member 20 to the other member. For the sake of convenience, the description of cushioning material 39 will be omitted in FIGS. 2 to 9.

One end portion 402 and the other end portion 404 of elastic support part 40 are parallel side parts here and are respectively provided along the X direction.

Elastic support part 40 is fixed to base plate 28 on the base end side (the other end portion 404 side), and magnets 34 and 35 opposing core 22 are fixed to the tip end side (one end portion 402 side) and are disposed to be elastically deformable in the vibration direction (up-down direction).

In the embodiment, elastic support part 40 extends in the Y direction (here, substantially horizontal) from the other side portion 282 of base plate 28 toward one side portion 281, and movable body 30 is fixed to one end portion 402 which is a free end on one side portion 281 side of base plate 28. In other words, since elastic support part 40 supports movable body 30 with a cantilever structure, it is not necessary to elastically support movable body 30 in the vibration direction, and it is possible to make the structure thin by reducing the height thereof. Further, since the plate spring that serves as elastic support part 40 is a simple rectangular plate shape, it is difficult to influence elastic support part 40 when being processed and formed, and elastic support part 40 having a capacity that hardly varies in the elastic deformation mode can be achieved. In addition, since movable body 30 is cantilevered by elastic support part 40 that extends substantially horizontally, movable body 30 is supported to be capable of vibrating in the up-down direction in a stable state.

Figure 8:
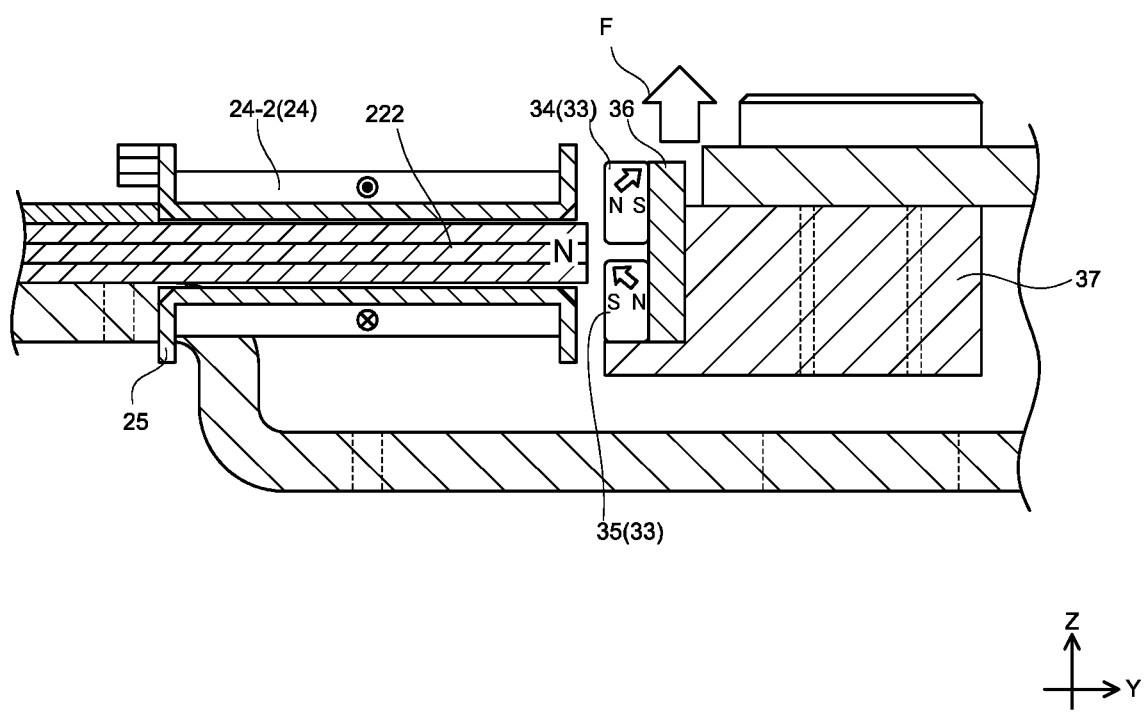
FIG. 8 is a view illustrating a magnetic circuit configuration of the vibration actuator according to Embodiment 1 of the invention.
Figure 9A:
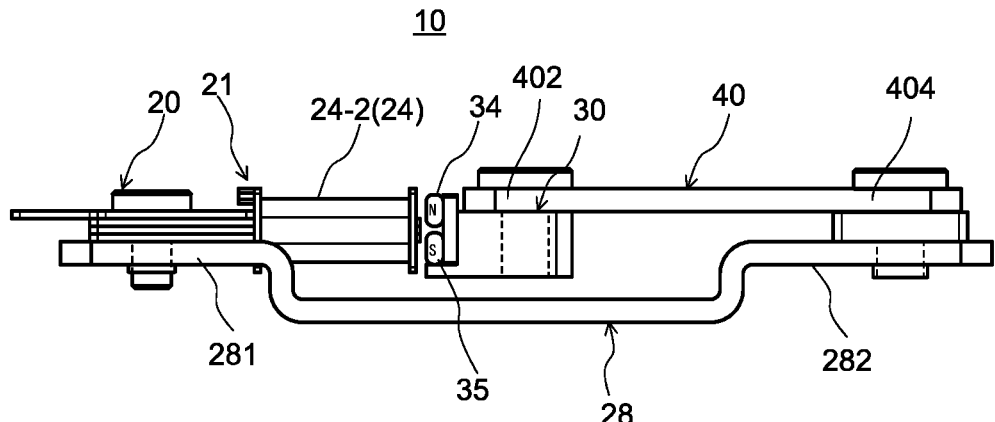
FIGS. 9A, 9B and 9C are views to be used for describing an operation of the vibration actuator according to Embodiment 1 of the invention.
Figure 9B:
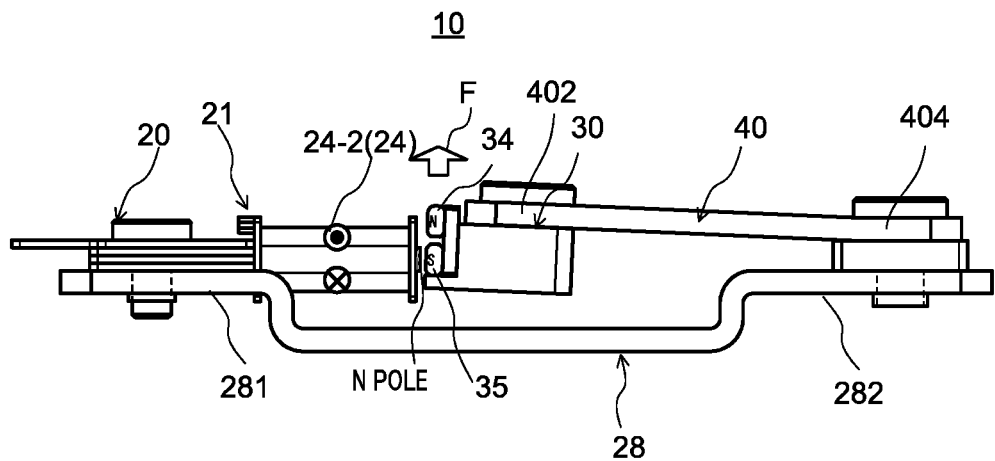
Figure 9C:
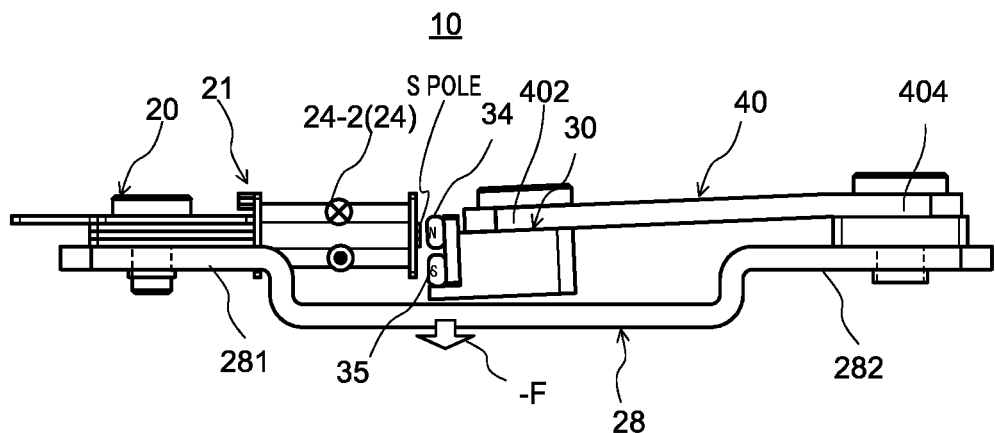

FIG. 8 is a view illustrating the magnetic circuit of vibration actuator 10. FIGS. 9A to 9C are side views illustrating the operation of movable body 30. In addition, coil 24 illustrated in FIGS. 8 and 9 is coil 24-2 (refer to FIG. 3) indicated by a partal view taken along line A-A in FIG. 3 for convenience. In other words, FIGS. 9A to 9C respectively illustrate a state (reference state) of movable body 30 at the time of de-energization, a state of movable body 30 when being energized in the counterclockwise direction as viewed from magnets 34 and 35 in coil 24-2 (24), and a state of movable body 30 when being energized in the clockwise direction as viewed from magnets 34 and 35 side in coil 24-2 (24). The other coils 24-1, 24-3, and 24-4 and magnets 34 and 35 are configured to differ only in the polarity between coil 24-2 and magnets 34 and 35, and to move movable body 30 in the same direction as that of the same magnetic circuit configuration. Accordingly, only the magnetic circuit configuration of a set of coil 24-2 and magnets 34 and 35 will be described in detail, and the description of other magnetic circuit configurations will be omitted.

Specifically, when coil 24-2 is energized in the counterclockwise direction as viewed from magnets 34 and 35 side, coil 24-4 is energized in the same direction and coils 24-1 and 24-3 are energized in the clockwise direction. In addition, when coil 24-2 is energized in the clockwise direction as viewed from magnets 34 and 35 side, coil 24-4 is energized in the same direction and coils 24-1 and 24-3 are energized in the clockwise direction. In other words, in the set of coils 24-1 to 24-4 and the corresponding magnets 34 and 35, the polarity on opposing coil 24 side and the polarity on magnets 34 and 35 side are different from those of the adjacent set, but a force that moves movable body 30 in the same direction is similarly generated.

In vibration actuator 10, movable body 30 is disposed in a state where the other end portion 404 is fixed on the other side portion 282 of base plate 28 of fixing body 20 via attenuation material 27 and is supported by one end portion 402 of elastic support part 40. Elastic support part 40 is disposed extending from the other side portion 282 side of base plate 28 toward one side portion 281 side. In addition, magnets 34 and 35 are disposed opposing the opening on one end side of coil 24 of fixing body 20.

Movable body 30 reciprocates in the Z direction, that is, in a direction toward and away from base plate 28 by energizing coil 24 from a power source supply part (not illustrated) via board 23. Specifically, movable body 30 swings with the other end portion 404 of elastic support part 40 as a fulcrum. Accordingly, the vibration output of vibration actuator 10 is transmitted to the user of the mobile device including vibration actuator 10.

In vibration actuator 10, the magnetic circuit illustrated in FIG. 8 is formed. In addition, in vibration actuator 10, coil 24 is disposed such that a winding axis of coil 24 and the magnetization direction of magnets 34 and 35 are parallel to each other or overlap each other such that a magnetic flux from magnets 34 and 35 passes through core pole part 222 on the inner side.

Therefore, when the energization is performed as illustrated in FIG. 8, due to the electric current that flows through coil 24, tip end surface 222a side of core pole part 222 becomes the N pole, magnet 35 is attracted to the N pole, magnet 34 repels, and thrust force F is generated in movable body 30 including magnets 34 and 35. Accordingly, movable body 30 which is elastically supported by elastic support part 40 swings in the F direction, that is, in the Z direction, around the other end portion 404 side as a fulcrum, and the state is changed from the state of FIG. 9A to the state of FIG. 9B.

In addition, when the energization direction of coil 24 is switched to the reverse direction and the energization is performed as illustrated in FIG. 9C, thrust force −F in the reverse direction (minus side in the Z direction) is generated. Thrust force −F causes movable body 30 to swing. Specifically, core pole part 222 of coil 24-2 (24) has a different magnetic pole, for example, S pole, and magnet 34 is attracted to the pole, and magnet 35 repels. Accordingly, thrust force −F is generated in movable body 30 including magnets 34 and 35, and vibrates in thrust force −F direction, that is, in the −Z direction, around the other end portion 404 side.

By repeating this, vibration actuator 10 swings movable body 30 reciprocatingly and generates the vibration in the vibration direction (Z direction).

Two magnets 34 and 35 are disposed as a set in the up-down direction with a gap in the vibration direction with respect to core pole part 222 wound around coil 24, and the vibration of movable body 30 is performed by the attractive force and the repulsive force of each of two magnets 34 and 35. Accordingly, stronger vibration is generated compared to the magnetic circuit based on the set of coil 24 and core pole part 222 in a case where there is only one magnet.

In addition, since there is a magnetic circuit including four sets including coil 24, core pole part 222, magnets 34 and 35, and back yoke 36, strong vibration can be generated by thrust forces F and −F generated in each of the four sets.

In vibration actuator 10, a magnetism generation part including core 22 around which coil 24 is wound and magnet part 33 is disposed on the side of movable body 30, and movable body 30 is fixed at one end portion 402 of elastic support part 40 which is the plate spring. Elastic support part 40 movably supports movable body 30 because the other end portion 404 is fixed to fixing body 20. Accordingly, the magnetism generation part is not provided in the Z direction, the support structure is simple, and thus, the design is simplified, it is possible to save the space, and it is possible to make vibration actuator 10 thin.

A vibration actuator in which the maximum thickness (the length in the Z direction) of vibration actuator 10 of the embodiment is determined by the height (the length in the Z direction) of bottom surface portion 283 of base plate 28, the movable region on the lower side of movable body 30, and movable body 30 part, and the length obtained by adding the movable region on the upper side of movable body 30, and which is excellent in the vibration output with a flat shape with the height in the Z direction as low as possible.

In addition, in vibration actuator 10 of the embodiment, in core 22, the excitation of core pole parts 222 adjacent to each other is performed to different magnetic poles. Accordingly, since it is possible to configure one magnetic circuit with respect to a set of core pole parts 222 and 222 adjacent to each other, the magnetic circuit efficiency is high, strong vibration can be generated, and it becomes possible to impart a vibration feeling to the user.

Here, vibration actuator 10 is driven by an AC wave input from the power source supply part (not illustrated) to coil 24 (24-1 to 24-4) via board 23. In other words, the energization direction of coil 24 is periodically switched, and the thrust force F on the plus side in the Z direction and thrust force −F on the minus side in the Z direction alternately act on movable body 30. Accordingly, magnets 34 and 35 swing to the plus side in the Z direction and the minus side in the Z direction with respect to core pole part 222, and accordingly, movable body 30 vibrates to the plus side in the Z direction and the minus side in the Z direction, more specifically, vibrates (driving of a rotational system) in an arc shape within a YZ plane with the other end portion 404 of elastic support part 40 as a fulcrum.

Hereinafter, a driving principle of vibration actuator 10 will be briefly described together with a driving principle of vibration actuator 10A which will be described later. In vibration actuators 10A and 10 of the embodiment, driving of the linear system and driving of the rotational system are performed.

In a case where a mass m [kg] of movable body 30A (refer to FIG. 13) and a spring constant $K_{sp}$ in a torsional direction are taken as a motion principle indicating the driving principle of the linear system, movable body 30A vibrates with respect to fixing body 20A by a resonance frequency $f_r$ [Hz] calculated by following equation 1. By driving vibration actuator 10A with an alternating current having a frequency substantially equal to the resonance frequency $f_r$, it becomes possible to efficiently obtain a large output. In other words, since it is possible to perform the driving with low power consumption in a normal state, the energy efficiency of vibration actuator 10A is improved.

[1]

$$f_r = \frac{1}{2\pi}\sqrt{\frac{K_{sp}}{m}}$$ (Equation 1)

In vibration actuator 10A of the embodiment, an alternating current having a frequency substantially equal to the resonance frequency $f_r$ of movable body 30A is supplied to coil 24 (240-1 to 240-8) via board 23, and core 22 (more specifically, core pole part 222) is magnetized via coil 24 (240-1 to 240-8). Accordingly, movable body 30A can be efficiently driven.

In addition, the motion equation indicating the operation principle of vibration actuator 10A is represented by following equation 1, and the circuit equation is expressed by following equation 2. In other words, the movable body 30A performs a reciprocating motion based on equations 2 and 3.

[2]

$$m\frac{d^2x(t)}{dt^2} = K_f i(t) - K_{sp}x(t) - D\frac{dx(t)}{dt}$$ (Equation 2)

m: mass [kg]
x(t): displacement [m]
$K_f$: thrust constant [N/A]
i(t): electric current [A]
$K_{sp}$: spring constant [N/m]
D: attenuation coefficient [N/(m/s)]

[3]

$$e(t) = Ri(t) + L\frac{di(t)}{dt} + K_e\frac{dx(t)}{dt}$$ (Equation 3)

e(t): voltage [V]
R: resistor [Ω]
L: inductance [H]
$K_e$: counter electromotive force constant [V/(m/s)]

In other words, the mass m [Kg], the displacement x(t) [m], the thrust constant $K_f$ [N/A], the current i(t) [A], the spring constant $K_{sp}$ [N/m], the attenuation coefficient D [N/(m/s)] and the like in vibration actuator 10A can be appropriately changed within a range that satisfies equation 2. Further, the voltage e(t) [V], the resistor R [Ω], the inductance L [H], and the counter electromotive force constant $K_e$ [V/(m/s)] can be appropriately changed within the range that satisfies equation 3.

In this manner, in a case where the driving is performed at the resonance frequency $f_r$ determined by the mass m of vibration actuator 10A and movable body 30A and the spring constant $K_{sp}$ obtained by superimposing the metal spring (the elastic body, that is, the plate spring in the embodiment) as elastic support parts 40A and 40B and the magnetic spring, it is possible to obtain a large output effectively.

The spring that elastically supports movable body 30A in vibration actuator 10A of the embodiment is mainly a metal spring which is elastic support part 40, and is configured to include a magnetic spring with core 22 (core pole part 222) around which coil 24 is wound and magnets 34 and 35.

In addition, the driving principle of the rotational system in vibration actuator 10 will be briefly described. In vibration actuator 10 of the embodiment, in a case where the moment of inertia of movable body 30 is J [kg·m²] and the spring constant of the plate spring which is elastic support part 40 in the torsional direction is $K_{sp}$, movable body 30 vibrates at the resonance frequency $f_r$ [Hz] calculated by following equation 4 with respect to fixing body 20.

[4]

$$f_r = \frac{1}{2\pi}\sqrt{\frac{K_{sp}}{J}} \quad \text{(Equation 4)}$$

Since movable body 30 configures a mass portion in a spring-mass system vibration model, when the AC wave having a frequency equal to the resonance frequency $f_r$ of movable body 30 is input to coil 24, movable body 30 is in a resonance state. In other words, by inputting the AC wave having a frequency substantially equal to the resonance frequency $f_r$ of movable body 30 from the power source supply part to coil 24, movable body 30 can efficiently vibrate.

The motion equation and the circuit equation indicating the driving principle of the rotational system of the vibration actuator 10 are illustrated hereinafter. Vibration actuator 10 is driven based on the motion equation illustrated by following equation 5 and the circuit equation illustrated by following equation 6.

[5]

$$J\frac{d^2\theta(t)}{dt^2} = K_t i(t) - K_{sp}\theta(t) - D\frac{d\theta(t)}{dt} \quad \text{(Equation 5)}$$

J: moment of inertia [kg·m²]
θ(t): angle [rad]
$K_t$: torque constant [N·m/A]
i(t): electric current [A]
$K_{sp}$: spring constant [N·m/rad]
D: attenuation coefficient [N·m/(rad/s)]

[6]

$$e(t) = Ri(t) + L\frac{di(t)}{dt} + K_e\frac{d\theta(t)}{dt} \quad \text{(Equation 6)}$$

e(t): voltage [V]
R: resistor [Ω]
L: inductance [H]
$K_e$: counter electromotive force constant [V/(rad/s)]

In other words, the moment of inertia J [kg·m²], the rotation angle θ(t) [rad], the torque constant $K_t$ [N·m/A], the current i(t) [A], the spring constant $K_{sp}$ [N·m/rad], the attenuation coefficient D [N·m/(rad/s)] and the like of movable body 30 in vibration actuator 10 can be appropriately changed within the range that satisfies equation 2. Further, the voltage e(t) [V], the resistor R [Ω], the inductance L [H], and the counter electromotive force constant $K_e$ [V/(rad/s)] can be appropriately changed within the range that satisfies equation 3.

In this manner, in the vibration actuator 10, in a case where coil 24 is energized by the AC wave that corresponds to the resonance frequency $f_r$ determined by the moment of inertia J of movable body 30 and the spring constant $K_{sp}$ of the plate spring part 33, it is possible to efficiently obtain a large vibration output.

Figure 10:
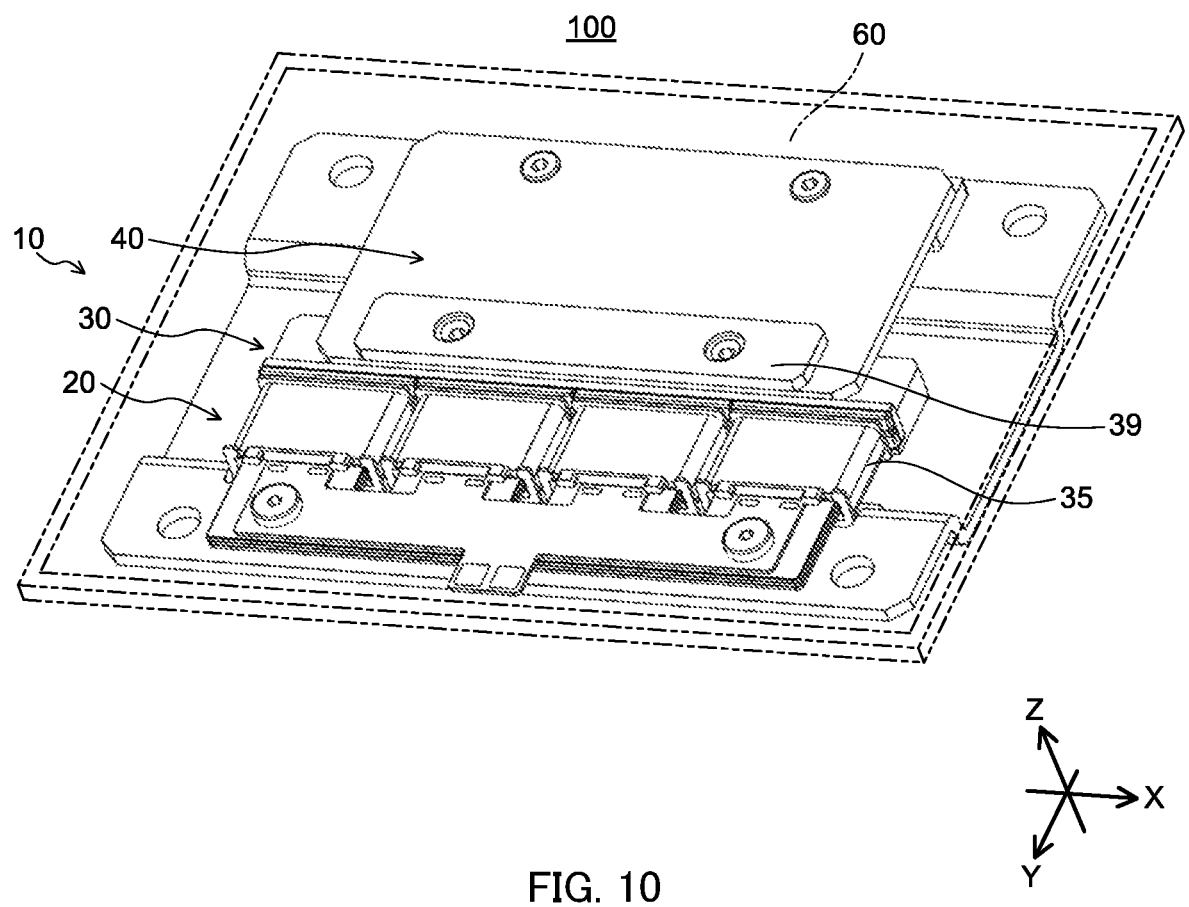
FIG. 10 is a perspective view of a touch panel apparatus including the vibration actuator according to Embodiment 1 of the invention.
Figure 11:
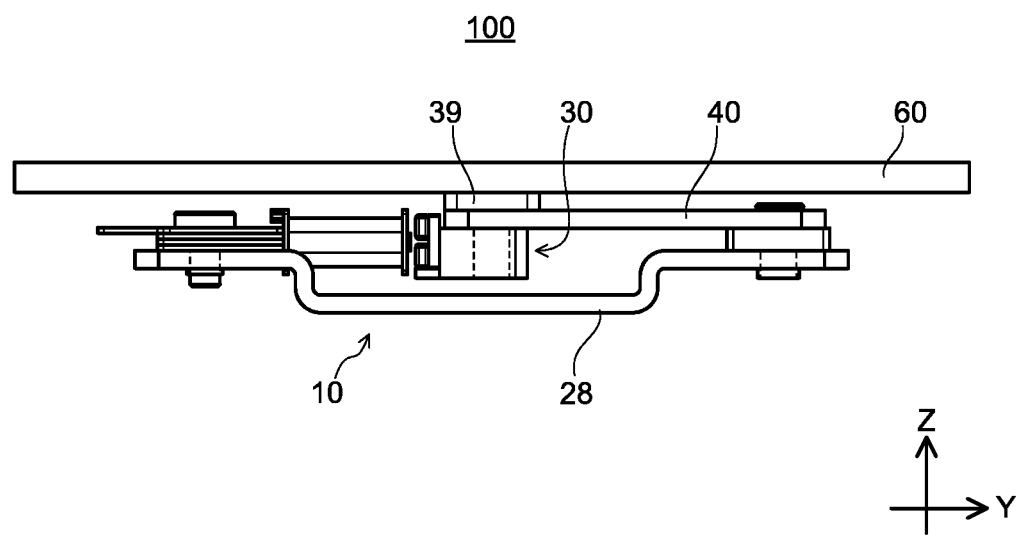
FIG. 11 is a view on a right side of the touch panel apparatus including the vibration actuator according to Embodiment 1 of the invention.

FIG. 10 is a perspective view of touch panel apparatus 100 including the vibration actuator according to Embodiment 1 of the invention, and FIG. 11 is a view on a right side of touch panel apparatus 100 including the vibration actuator according to Embodiment 1 of the invention. Touch panel apparatus 100 illustrated in FIGS. 10 and 11 is an example of the vibration providing apparatus. Vibration actuator 10 is fixed to back surface 61 of touch panel 60 that displays an image via cushioning material 39 for connection. Cushioning material 39 may be configured of the same material as attenuation material 27.

Base plate 28 of vibration actuator 10 is fixed to a part to which touch panel apparatus 100 is attached.

In other words, in touch panel apparatus 100 including touch panel 60, touch panel 60 is fixed to movable body 30 of vibration actuator 10 having fixing body 20 fixed to an attachment part of touch panel apparatus 100. Accordingly, touch panel 60 itself is driven integrally with movable body 30.

In this manner, according to touch panel apparatus 100 on which vibration actuator 10 is mounted, touch panel 60 is directly operated, that is, touch panel 60 is driven together with movable body 30, and thus, touch panel 60 can be directly driven with strong vibration. Accordingly, when operating in contact with the image displayed on touch panel 60, it is possible to feed back a strong feeling to the user via touch panel 60. Specifically, in a case where the user operates touch panel 60 with a finger, by directly moving touch panel 60 with respect to the finger of the user, it is possible to impart a sense of touch that an operation button or the like is pressed on touch panel 60. Further, unlike the vibration along a surface direction, with respect to touch panel 60, the vibration is generated along the direction of coming into contact with touch panel 60, and accordingly, a strong feeling of vibration can be imparted to the user.

In particular, it is useful for a touch display apparatus or an operating apparatus equipped with the touch panel apparatus for feedbacking a strong feeling when the user touches the apparatus in a vehicle-mounted product or an industrial device.

Touch panel 60 can be configured with a single vibration actuator 10, and structurally can dispose the magnetism generation part including movable body 30, core unit 21 which is a driving source, and magnet part 33 laterally, and it is possible to make the overall vibration actuator 10 thin.

According to vibration actuator 10 of the embodiment, fixing body 20 having coil 24 wound around the outer peripheries of N-fold (N is a natural number) of 2 of core pole parts 222 and core pole parts 222; movable body 30 having magnet parts 33 disposed being separated from each other in the axial direction of each of core pole parts 222, for each of core pole parts 222; and the elastic support part (plate spring) 40 that movably supports movable body 30 with respect to fixing body 20, are provided.

Magnet part 33 has magnetic poles disposed on core pole part 222 sides opposing each other, and movable body 30 vibrates in the direction orthogonal to both directions including the direction in which N-fold of 2 of core pole parts 222 are aligned and the axial direction of coil 24 by the attractive force or the repulsive force between core pole part 222 and magnet part 33 which are magnetized as coil 24 is energized.

Accordingly, it is possible to realize vibration actuator 10 which is capable of outputting stable and strong vibration and is made thin. In addition, even in a case of being attached to touch panel 60, it is possible to impart a strong feeling to the user when operating touch panel 60, and it is possible to make touch panel apparatus 100 itself including touch panel 60 thin.

In addition, the vibration providing apparatus may be applied to the operating apparatus that inputs an operation by bringing a finger or the like into contact with the vibration providing apparatus, and the vibration may be generated in response to the contact operation.

Embodiment 2

Figure 12:
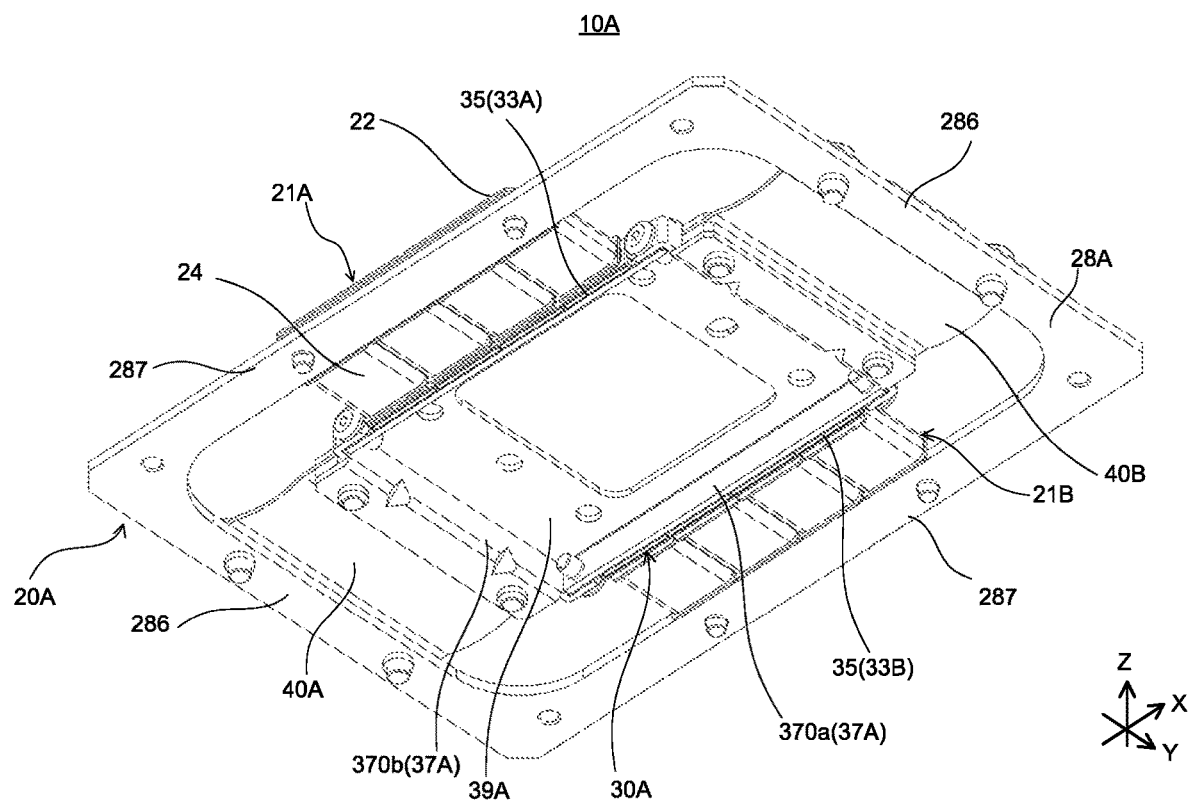
FIG. 12 is an external perspective view on a bottom side of a vibration actuator according to Embodiment 2 of the invention.
Figure 13:
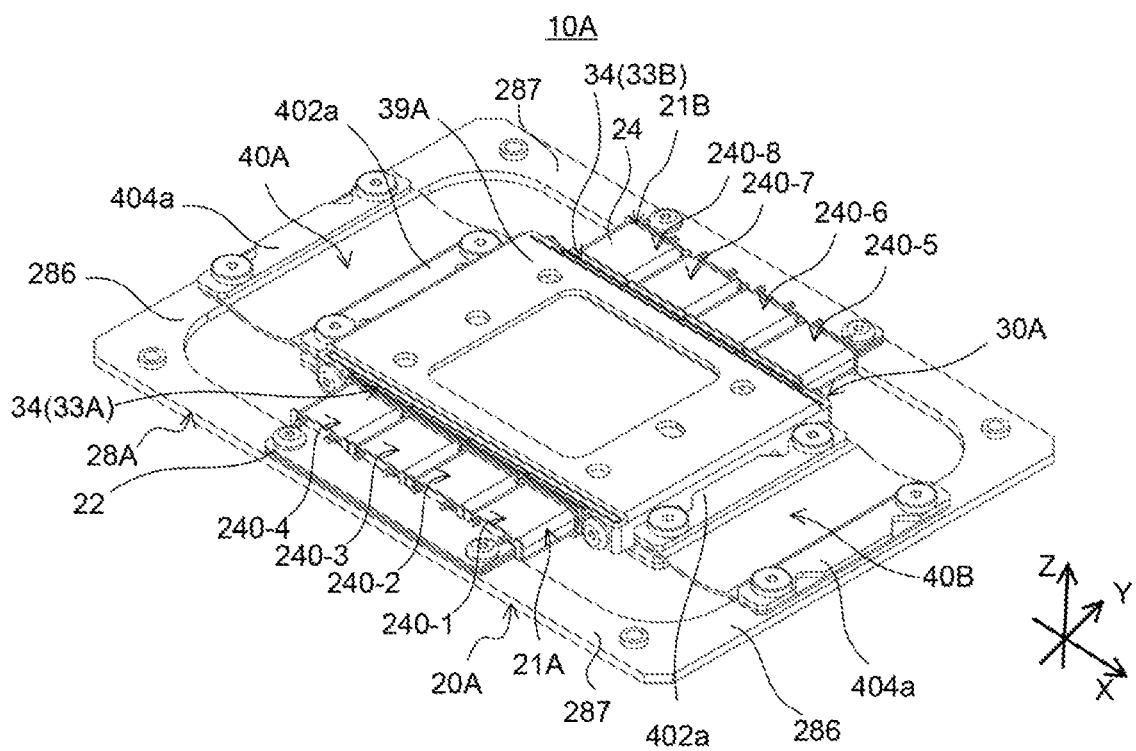
FIG. 13 is an external perspective view on a planar side of the vibration actuator according to Embodiment 2 of the invention.

FIG. 12 is an external perspective view on a bottom side of vibration actuator 10A according to Embodiment 2 of the invention, and FIG. 13 is an external perspective view on a planar side of vibration actuator 10A according to Embodiment 2 of the invention. In addition, vibration actuator 10A of Embodiment 2 has the same basic configuration as that of vibration actuator 10 that corresponds to Embodiment 1 described with reference to FIGS. 1 to 9, but is different mainly in that two core units 21A and 21B are disposed in fixing body 20A and magnet parts 33A and 33B that correspond to each of core units 21A and 21B are disposed in movable body 30A. Hereinafter, the same configuration elements as those of vibration actuator 10 have similar functions, the same configuration elements will be given the same reference numerals, and the description thereof will be omitted.

Similar to vibration actuator 10, vibration actuator 10A illustrated in FIGS. 12 and 13 is mounted on the electronic device as the vibration generation source to realize the vibration function of the electronic device. For example, vibration actuator 10A is applied to a car navigation apparatus or the like being mounted on touch panel apparatus 100A (refer to FIG. 14).

Vibration actuator 10A includes: fixing body 20A having core units 21A and 21B configured similarly to core unit 21 of Embodiment 1 having core 22 around which coil 24 is wound; movable body 30A having magnet parts 33A and 33B (34, 35) similar to magnet part 33 of Embodiment 1; and elastic support parts 40A and 40B which elastically support movable body 30A to be movable in the vibration direction with respect to fixing body 20A.

Similarly to vibration actuator 10, vibration actuator 10A vibrates movable body 30A by the attractive force or the repulsive force generated between coil 24 to be energized and core pole part 222 of core 22 to be excited by coil 24 to be energized and magnet part 33 (34, 35).

Vibration actuator 10A is a vibration body having a flat shape of which a thickness direction is the Z direction. Vibration actuator 10A vibrates movable body 30A with respect to fixing body 20A in the Z direction, that is, in the thickness direction as the vibration direction.

In vibration actuator 10A of the embodiment, in base plate 28A formed in a frame shape, core units 21A and 21B are attached to two fixing body side portions 287 that respectively extend in the X direction and oppose each other in the Y direction such that core pole parts 222 oppose each other.

Base plate 28A is formed in a rectangular frame shape including band-shaped fixing body end side portions 286 disposed being separated from each other in the X direction, and two band-shaped fixing body side portions 287 disposed being separated from each other in the Y direction.

Movable body 30A having magnet parts 33A and 33B disposed opposing core pole parts 222 of core units 21A and 21B is disposed on the inner side of base plate 28A having a rectangular frame shape with a predetermined space therebetween.

Each of magnet parts 33A and 33B is configured similarly to magnet part 33, and has two magnets 34 and 35 opposing one core pole part 222 in plural (four sets here) in the X direction (vibration direction).

Magnet parts 33A and 33B are respectively fixed to each of two opposing side portions 370a of rectangular frame-shaped holding part 37A. Two side portions 370a also has a back yoke function, and are formed of a magnetic body here.

At the edge portion on one side (here, the edge portion on the upper surface side) opening in the vibration direction of frame-shaped holding part 37A, plane-shaped attachment member 39A having an opening formed at the center is provided.

Attachment member 39A is fixed to a movable object and vibrates the movable object. Attachment member 39A may be formed of the same material as cushioning material 39.

Magnet parts 33A and 33B are disposed being aligned with core pole part 222 of core units 21A and 21B on movable body 30A side and in the Y direction, and accordingly, it is possible to achieve a thin structure. In addition, since the magnetic circuit configuration including core units 21A and 21B, magnet parts 33A and 33B, and two side portions 370a having the function of back yoke is similar to the magnetic circuit configuration of Embodiment 1 illustrated in FIG. 8, the description thereof will be omitted.

Both end portions of each of two side portions 370a are fixed to both end portions of two end side portions 370b. Frame-shaped holding part 37A is configured with two side portions 370a and two end side portions 370b. One end portion 402a of each of elastic support parts 40A and 40B is fixed to two end side portions 370b.

Elastic support parts 40A and 40B have the same function as that of elastic support part 40, and in the embodiment, the elastic support parts are the same elastically deformable plate springs.

Elastic support parts 40A and 40B respectively fix the other end portion 404a to two fixing body end side portions 286 that extend in the Y direction of base plate 28A and fix one end portion 402a to movable body 30A. Accordingly, elastic support parts 40A and 40B support movable body 30A to be movable, that is, to freely vibrate, with respect to fixing body 20A on the inner side of base plate 28A of fixing body 20A in the vibration direction (the minus side in the Z direction and the plus side in the Z direction).

In addition, although elastic support parts 40A and 40B may be flat plate springs, in the embodiment, at a part between one end portion 402a and the other end portion 404a, that is, at a part at which one end portion 402a and the other end portion 404a are elastically deformed being connected to each other, a bending part bent to be convex may be provided on the plus side in the Z direction or on the minus side in the Z direction. The plate spring that serves as elastic support parts 40A and 40B determines the direction of deflection by the curved part. In addition, the part that connects one end portion 402a and the other end portion 404a of elastic support parts 40A and 40B to each other may have a bellows shape. In addition, in the embodiment, since attachment member 39A is provided on the upper side, the orientation of the curvature is set to be an orientation of becoming convex to the lower side, and accordingly, the thickness in the vibration direction is made thinner than that of the convex to the upper side.

Accordingly, when coil 24 is energized, similarly to magnet part 33 of vibration actuator 10A, when magnet parts 33A and 33B move by obtaining the thrust force, elastic support parts 40A and 40B can elastically deform smoothly following the movement and bend, and movable body 30A can reciprocate along the vibration direction, that is, the vibration can be smoothly performed.

In addition, in vibration actuator 10A, movable body 30A is driven in the vibration direction by the magnetism generation part having core units 21A and 21B and magnet parts 33A and 33B at each of both side portions (two side portions 370a) separated from each other in the Y direction. Accordingly, stronger vibration can be obtained, and a stronger vibration feeling can be imparted.

In vibration actuator 10A configured in this manner, in core units 21A and 21B, the tip end surface of the core pole part is magnetized by the AC wave input from the power source supply part (not illustrated) to coil 24, and the magnetic attractive force and the repulsive force are effectively generated with respect to each of magnets 34 and 35 of magnet parts 33A and 33B on movable body 30A.

Accordingly, magnet parts 33A and 33B of movable body 30A reciprocate in the Z direction with reference to a position at which a position (here, the center of the core pole part as viewed from the side surface) that becomes a reference position and the center position in the Z direction of the gap between magnets 34 and 35 being separated from each other in the up-down direction in magnet parts 33A and 33B overlap each other. In addition, since the driving principle is the same operation principle of vibration actuator 10 of Embodiment 1 realized by above-described equations 1 to 6, the description thereof will be omitted. In vibration actuator 10A, similar to Embodiment 1, by changing the orientation of the electric current to be supplied to coil 24, movable body 30A including magnet parts 33A and 33B reciprocates (vibrates back and forth) in the vibration direction (Z direction), that is, in the direction orthogonal to both directions including the direction in which the core and magnet parts 33A and 33B oppose each other and the direction in which elastic support parts 40A and 40B extend.

Figure 14:
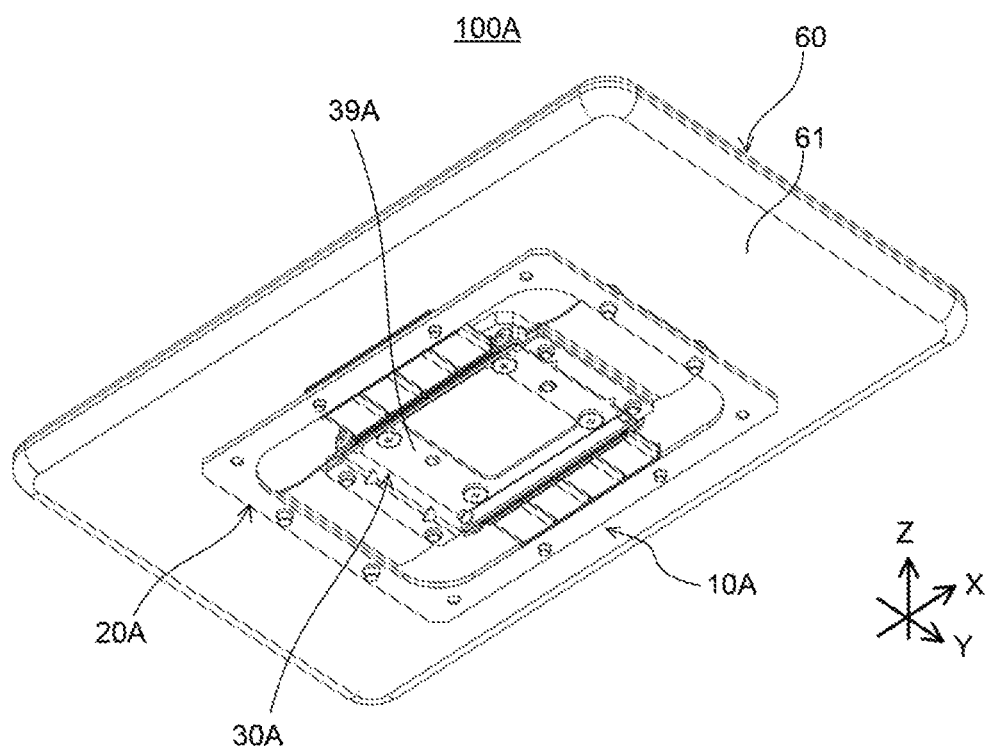
FIG. 14 is a perspective view of a touch panel apparatus including the vibration actuator according to Embodiment 2 of the invention.

FIG. 14 is a perspective view of touch panel apparatus 100A including vibration actuator 10A according to Embodiment 2 of the invention. The touch panel apparatus illustrated in FIG. 14 is an example of the vibration providing apparatus. In touch panel apparatus 100A, vibration actuator 10A is fixed to back surface 61 of touch panel 60 that displays an image via attachment member 39A for connection.

Base plate 28A of vibration actuator 10A is fixed to a part to which touch panel 60 is attached.

Accordingly, in touch panel apparatus 100A including touch panel 60, touch panel 60 is fixed to movable body 30A of vibration actuator 10A having fixing body 20A fixed to an attachment part of touch panel apparatus 100A. Accordingly, touch panel 60 itself vibrates integrally with movable body 30A elastically supported via elastic support parts 40A and 40B with respect to fixing body 20A.

In this manner, according to touch panel apparatus 100A on which vibration actuator 10A is mounted, in order to directly operate touch panel 60, when the user touches the image displayed on touch panel 60 and operates touch panel 60, it is possible to feed back a stronger feeling to the user.

[Modification Example in Vibration Actuator 10A]

As illustrated in FIG. 13, in vibration actuator 10A, each of core units 21A and 21B has a configuration respectively including four electromagnet parts 240-1 to 240-8 having the core pole part to be excited by energizing coil 24. Electromagnet parts 240-1 to 240-8 are disposed along both side portions separated from each other in the Y direction in movable body 30A.

Accordingly, for example, by configuring the energization direction of each of coils 24 of electromagnet parts 240-1 to 240-8 appropriately, movable body 30A can have a posture along the X direction, the Y direction, the Z direction, a twisting direction around the X axis, a twisting direction around the Y axis, and a twisting direction around the Z axis. As an example, a magnetic circuit in which electromagnet parts 240-1 and 240-2 are one set, a magnetic circuit in which electromagnet parts 240-3 and 240-4 are one set, a magnetic circuit in which electromagnet parts 240-5 and 240-6 are one set, and a magnetic circuit in which electromagnet parts 240-7 and 240-8 are one set, are employed, and it is possible to move movable body 30A as an independent driving force generation part. Specifically, in each set of electromagnet parts, the core pole parts adjacent to each other are excited to have different magnetizations. By moving the opposing magnet parts to the plus side in the Z direction and the minus side in the Z direction in the core pole parts of each set of the electromagnet parts, movable body 30A can have a posture along the X direction, the Y direction, the Z direction, the twisting direction around the X axis, the twisting direction around the Y axis, and the twisting direction around the Z axis. Accordingly, it is possible to appropriately change the posture of touch panel 60 by attaching vibration actuator 10A, and it is possible to make the posture easy for the user to visually recognize or the posture that the user can easily operate.

In core units 21, 21A, and 21B in vibration actuators 10 and 10A of the embodiment, core pole parts 222 are provided four by four, but core pole parts 222 may be provided at least two by two. In other words, in core units 21, 21A, and 21B in vibration actuators 10 and 10A, core pole part 222 is configured to have an even number of six or more, and correspondingly, a configuration including magnet part 33 disposed similarly to the embodiment may be employed. At this time, in core units 21, 21A, and 22B, it is preferable that coils 24 are wound around each of the outer peripheries to be excited with different polarities.

Above, the embodiments of the invention have been described. In addition, the description above is an example of a preferred embodiment of the invention, and the scope of the invention is not limited thereto. In other words, the description of the configuration of the apparatus or the shape of each part are merely examples, and it is apparent that various modifications and additions to the examples are possible within the scope of the invention.

INDUSTRIAL APPLICABILITY

Even in a case where the vibration actuator according to the invention is attached to the touch panel, there is an effect that it is possible to impart a strong feeling to the user at the time of operating the touch panel and to realize a thin structure, and for example, the vibration actuator is useful when using in a case where the touch panel itself is movable in a car navigation apparatus or the like.

REFERENCE SIGNS LIST 10, 10A Vibration actuator
20, 20A Fixing body
21, 21A, 21B Core unit
22 Core
221 Core main body
222 Core pole part
222a Tip end surface
23 Board
24 Coil
25 Bobbin 26, 42, 43 Screw
27 Attenuation material
28, 28A Base plate
281 One side portion
282 Other side portion
283 Bottom surface portion
30, 30A Movable body
33, 33A, 33B Magnet part
34 Magnet (first magnet)
35 Magnet (second magnet)
36 Back yoke
37 Magnet holder
37A Frame-shaped holding part
370a Side portion
370b End side portion
39 Cushioning material
39A Attachment member
40, 40A, 40B Elastic support part
402, 402a One end portion
404, 404a Other end portion
60 Touch panel
61 Back surface
100, 100A Touch panel apparatus (vibration providing apparatus)

What is claimed is:

1. A vibration actuator, comprising:
a fixing body including N-fold (N is a natural number) of 2 of core pole parts and a coil wound around an outer periphery of each of the core pole parts;
a movable body including a magnet part disposed while being separated from each of the core pole parts in an axial direction of each of the core pole parts, for each of the core pole parts; and
an elastic support part that movably supports the movable body with respect to the fixing body,
wherein the magnet part includes magnetic poles disposed on sides of the core pole parts and respectively facing the core pole parts, and
wherein the movable body vibrates in a direction orthogonal to both directions including a direction in which the N-fold of 2 of the core pole parts are aligned and the axial direction of the coil by an attractive force or a repulsive force between the core pole parts to be excited by the energization of the coil and the magnet part.

2. The vibration actuator according to claim 1,
wherein the magnet part includes a first magnet and a second magnet which are disposed being aligned in a vibration direction of the movable body and includes different magnetic poles magnetized on a side of the core pole part, with respect to one of the core pole parts.

3. The vibration actuator according to claim 2,
wherein the first magnet and the second magnet are disposed with a gap in the vibration direction of the movable body, and
wherein an end surface of the core pole part to which the first magnet and the second magnet oppose and the gap are positioned at a position at which the end surface and the gap face each other in the axial direction of the core pole part, when the coil is de-energized.

4. The vibration actuator according to claim 1,
wherein the core pole parts adjacent to each other are excited as different magnetic poles.

5. The vibration actuator according to claim 2,
wherein the core pole parts adjacent to each other are excited at different magnetic poles, and
wherein the first magnets and the second magnets include magnetic poles different from each other, in the magnet parts which respectively face the core pole parts adjacent to each other.

6. The vibration actuator according to claim 1,
wherein the elastic support part is a plate spring disposed in a direction intersecting a vibration direction of the movable body.

7. The vibration actuator according to claim 6,
wherein one end portion of the elastic support part is fixed to the fixing body, and another end portion thereof is fixed to the magnet part disposed opposing the N-fold of 2 of the core pole portions and thus the elastic support part is disposed to be elastically deformable in the direction in which the movable body vibrates.

8. The vibration actuator according to claim 1,
wherein the elastic support part is fixed to the fixing body via an attenuation material that attenuates a vibration of the elastic support part.

9. A vibration providing apparatus, comprising:
the vibration actuator according to claim 1; and
a touch panel on which the vibration actuator is mounted.

* * * * *